United States Patent [19]

Sturrock et al.

[11] 3,996,616
[45] Dec. 7, 1976

[54] COMBINATION CASSETTE CHANGER AND RECORDING MACHINE

[75] Inventors: James C. Sturrock, Atlanta; Robert N. Fink, Decatur, both of Ga.

[73] Assignee: Robert N. Fink, Decatur, Ga.

[22] Filed: Jan. 20, 1975

[21] Appl. No.: 542,108

[52] U.S. Cl. ................................. 360/92; 360/71; 360/96; 360/105
[51] Int. Cl.² ..................... G11B 23/04; G11B 5/00
[58] Field of Search ............... 360/92, 96, 105, 91, 360/93, 132, 71, 85; 242/197–200

[56] References Cited

UNITED STATES PATENTS

| | | | |
|---|---|---|---|
| 3,833,224 | 9/1974 | Haake | 360/92 |
| 3,852,819 | 12/1974 | Staar | 360/92 |
| 3,860,964 | 1/1975 | Kozu et al. | 360/92 |
| 3,886,593 | 5/1975 | Sato | 360/92 |

OTHER PUBLICATIONS

IBM Technical Disclosure Bulletin, R. A. Barbeau et al., vol. 4 No. 11, Apr. 1962, pp. 11–13.

*Primary Examiner*—Alfred H. Eddleman

[57] ABSTRACT

A combination cassette changer and recording machine in which a remotely controlled cassette changer mounted on a conventional cassette recording machine substitutes a cassette from its magazine for the cassette previously installed in the machine. The changer first opens the cassette cradle, then, using a vertically reciprocal ram assembly, extracts the used cassette and, thereafter, inserts the new cassette in its place. Finally, the changer closes the cradle for further operation.

6 Claims, 6 Drawing Figures

COMBINATION CASSETTE CHANGER AND RECORDING MACHINE

BACKGROUND OF THE INVENTION

1. Field of the Invention

This invention relates to a cassette changer and is more particularly concerned with a combination cassette changer and recording machine in which the changer will feed successive cassettes to a recording machine while discharging the previously inserted cassette in response to signals. The assembly is particularly useful as a remote control dictating machine which may be actuated from one or a plurality of remote control switches.

2. Description of the Prior Art

In the past, recording machines, using enclosed reels of magnetic tape known as cassettes, have been used, extensively. Usually, the cassette is manually inserted and removed from the cassette receiving cavity or pocket.

Some attempts have been made to make machines which will substitute one tape recording medium for the next. Such machines usually are complicated and expensive. To the best of our knowledge, none are capable of substituting one cassette for the next in a machine of the type having a pivoted cradle which receives the cassette in a pocket.

The Applicants are aware of the following U.S. Pat. Nos. relating to such prior art machines, 3,620,385, 3,677,555, 3,650,413, 3,690,587, 3,656,705.

SUMMARY OF THE INVENTION

Briefly described the present invention includes a conventional cassette recording machine which has a cradle for receiving the cassette. The cradle has a cassette receiving cavity or pocket and is pivotally mounted for pivoting about a transverse axis from an open cassette receiving position to a closed cassette utilization position. The cradle is spring loaded to an open position and is retained in a closed condition by a detent actuated to release the cradle upon depression of a push button.

The cassette changer is mounted on top of the recording machine and includes a ram extractor assembly, the ram of which is in registry with the cradle, when it is in its open position. The ram extractor assembly is reciprocated toward and away from the cassette which is carried by the pocket and in its most extended or downward position engages the cassette to withdraw it as the ram extractor assembly is retracted.

A magazine, disposed along side the ram, carries a plurality of juxtaposed cassettes spring urged toward the ram. In its most retracted position, the forwardmost cassette is inserted beneath the cam soon after the extracted cassette is released.

The changer also has a cradle control comprising a release button actuator for causing the releasing of the cradle from its closed position and a cradle closer for returning the cradle from an open position to a closed position.

DETAILED DESCRIPTION

Figure 1:
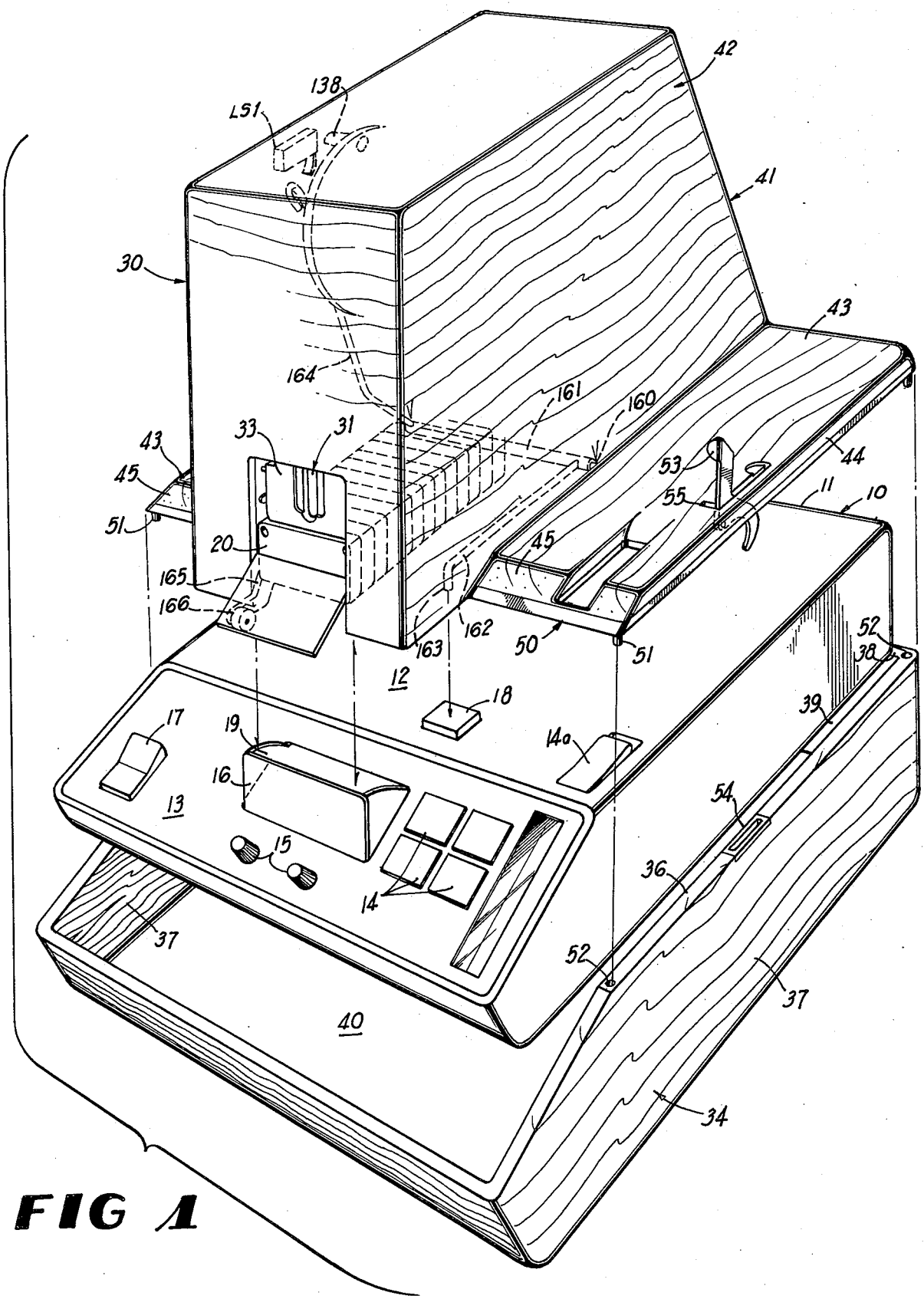
FIG. 1 is an exploded perspective view of a combination cassette changer and recording machine constructed in accordance with the present invention.

Referring now in detail to the embodiment chosen for the purpose of illustrating the present invention, numeral 10 in FIG. 1 denotes a conventional cassette recording machine which has a casing 11 provided with a flat top panel 12, a forwardly and downwardly inclined front panel 13, control buttons 14, 14a, control knobs 15 a cassette carriage means, such as cradle 16, and an on-off switch 17 and a cassette carriage or cradle release means, such as button 18. It will be understood that, while a cassette recording machine 10 is depicted in the drawing, the present changer is capable of use with a cassette playing machine. Hence, by the term "magnetic tape machine," a cassette recording or a cassette playing machine or one capable of both operations is intended.

In the embodiment depicted in FIG. 1, the cassette cradle 16 is pivotally mounted on panel 13 by its closed lower or outer edge portion for pivoting about a transverse axis. When the cradle 16 is in its closed condition, it is at an incline and flush with the panel 13. In such a condition, a detent (not shown) holds the cradle 16 closed. The detent releases the cradle 16 when release 18 on panel 12 is depressed.

When the cradle 16 is released a spring (not shown) urges the cradle 16, in an arcuate path, for pivoting about its axis, to an upright open position. In such a position the cavity or pocket 19 is available for the insertion therein or removal therefrom of a cassette 20.

The recording machine 10 of the present invention employs "mini cassettes" 20 of the type having holes 21 at their rear corners.

The structure thus far described in this detailed description is conventional.

In accordance with the present invention, a cassette changer 30 is disposed on the recording machine 10 so that its ram and ejector assembly 31 is in alignment or in registry with the mouth of the cassette receiving pocket 19 of the opened and upright cradle 16. The assembly 31 functions as a ram to insert cassettes 20 into the cavity or pocket 19 and as an extractor assembly to remove the same therefrom. Assembly 31 thus functions as a cassette engaging and moving means which clamps or grasps the cassette 20 to be extracted, moves the engaged cassette out of position and a replacement cassette into position in pocket 19.

A magazine, denoted by numeral 32, supports a plurality of juxtaposed mini cassettes 20, stacked side-by-side for feeding, one-at-a-time, beneath the ram or mandrel 33 after the ram and ejector assembly 31 has extracted a mini cassette 20 from pocket 19.

In more detail, the combination cassette changer and recording machine includes an upwardly opening machine receiving box or lower casing 34 which conforms to the shape of the bottoms and sides of and receives machine 10, so that panel 12 is disposed in a common horizontal plane with the upper edges 36 of sides 37 and edge 38 of back 39 when the housing 11 rests upon bottom 40 of box 34. Thus, panels 12 and 13 are left exposed for the manipulation of buttons 14, switch 17 and control knobs 15.

Received by the edges 36 and 38 is a changer carrying frame 50 and an upper casing 41 having a downwardly opening, inverted box shaped, central changer housing 42 provided, at its lower side edges, with opposed, co-planar, complimentary, rectangular, outwardly extending, wing-like, housing support plates 43. The edges of each plate 43 are turned downwardly to provide peripheral positioning flanges such as side flange 44 and front flanges 45.

The front flanges 45 overlie frame 50 and the upper edge portion of panel 13 as the edge portions of plates 43 are received by the edge portions of frame 50 which, in turn are received by edges 36 and 38 with the flanges 44 outwardly of sides 37. Thus, the upper casing or cover 41 may be readily lifted off the machine 10 and frame 50, when desired.

The cassette changer 30 is carried by rectangular frame 50, the frame 50 having alignment pins 51, at its corners. The frame 50 is disposed between plates 43 and edges 36, 38 so that the pins 51 project into holes 52 in edges 36. Bellcrank latches 53 are pivotally mounted on the frame 50 and project upwardly through appropriate L shaped slots 55 in plates 43 and project also downwardly through appropriate holes 54 in side 37 for providing detents which latch the three elements together.

Figure 2:
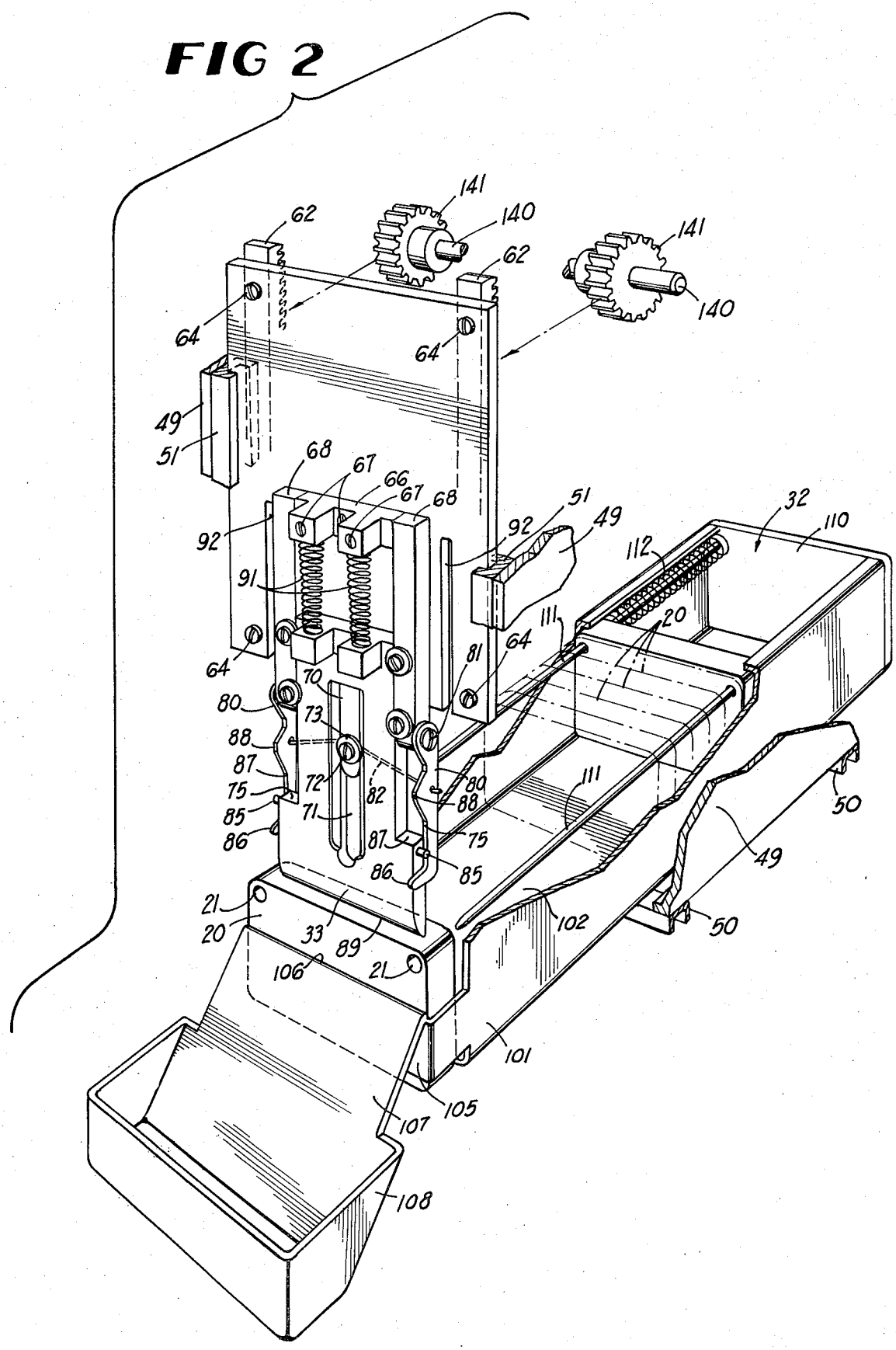
FIG. 2 is a fragmentary perspective view of the combination changer and recording machine shown in FIG. 1.

The frame 50, in its central portion, supports a pair of spaced opposed upright panels 49, which, in turn support a pair of upright, opposed, parallel, inwardly opening, channel members 51, which slidably carry for reciprocation in a vertical path, the assembly 31. The ram and ejector assembly 31 is best understood by reference to FIG. 2. In that figure, it will be observed that the assembly 31 includes a rectangular, vertically disposed, flat carriage plate 61 slidably carried by its side edges in channel members 51.

On the rear surface of the plate 61, are a pair of vertically disposed, spaced, parallel racks 62 secured in place by bolts 64. The teeth of the racks 62 face rearwardly. The function of the racks 62 is to lower and raise plate 61 in a vertical path, as will be explained hereinafter.

Mounted on the central front surface of plate 61 is a spring arresting block 66 secured in place by bolts 67. Outwardly of the block 68, on both sides, are a pair of vertically disposed, opposed, complimentary, ram positioning guides 68. The lower portions of guides 68 slidably receive therebetween the upper edge portions of the cassette inserting mandrel or ram 33. Thus, any appreciable lateral movement of the ram 33 is arrested by guides 68.

Midway between the guides 68 is ram retaining bar 70 which protrudes through a closed vertically elongated slot 71 in the ram 33. A bolt 72, having a head 73 wider than slot 71, secures the bar 70 in place on plate 61 and the head 73 arrests outward movement of ram 33. Thus, the ram 33 is free to move vertically within the limits prescribed by slot 71 and bar 70.

The lower end portion of ram 33 is wider than the upper portion to provide a pair of shoulders 75 which may abut the ends of guides 68 when the ram 33 is in its uppermost position. Pivotally carried by the lower end portions of the guides 68 are the extractors or ejectors 80, the function of which is to provide a means for engaging the cassette 20 within the machine 10 and withdrawing the cassette 20 upon reciprocation of the assembly 31.

Transversely aligned pivot pins 81, which pass through the upper end portions of the hook shaped ejectors 80 and into the guides 68, respectively, pivotally secure the ejectors 80 in a pendant manner to the end of guide 68 for pivoting about a transverse axis. The ejectors 80 are yieldably urged forwardly by the end portions of a wire spring 82, the central portion of which is looped around a retaining screw 83 threadably received into the back of block 70 below plate 61. Forward movement of the ejectors 80 is arrested by a pair of aligned camming pins 85 projecting from the sides of the lower portion of ram 33.

The complimentary ejectors 80 are flat member, the lower ends of which are provided with extractor latches or fingers 86 which are spaced apart by a distance equal to the distance between the centers of holes 21 in cassette 20 so that these fingers 86 project into the holes when it is desired to withdraw the cassette 20 from machine 10.

The front surfaces of ejectors 80 have camming surfaces 87 which ride on pins 85. The camming surfaces have nodes or lobes 88 which swing the ejectors 80 rearwardly as the pins 85 pass thereover. This permits the fingers 86 to clear the edge of the cassette 20 and then project into holes 21, as the plate 61 is moved downwardly and the lower edge 89 of ram 33 engages the upper edge of cassette 20 to arrest further downward movement of ram 33 therewith.

In the upper portion of ram 33, is a spring receiving block 90. A pair of coiled springs 91 are mounted between block 66 and block 90 so as yieldably to urge the ram 33 downwardly at all times.

On opposite sides of the guides 68, the plate 61 is provided with downwardly opening slots 92 which receive the opposed vertical side walls 101 of the U shaped cassette magazine 32 mounted horizontally on the central portion of frame 50. The function of the cassette magazine 32 is to carry a plurality of juxtaposed vertically disposed cassettes 20 in side-by-side relationship. The magazine 32 is of thin sheet metal bent to provide a flat bottom 102 the edges of which the opposed, upstanding, parallel walls 101. The forward edge portions of walls 101 project the beyond the front bottom edge 103 of bottom 102 by a distance slightly greater than the width of a cassette 20.

The forward ends of the magazine side walls 101 carry an arresting plate 105, the upper edge portion 106 of which is bent outwardly and downwardly to provide a delivery chute 107 which supports, at its lower end, a cassette hopper 108. The ram 33 in its travel passes inwardly adjacent plate 105.

The magazine 32 is provided with a back 110 and a pair of forwardly extending, parallel rods or tines 111. The centers of rods 111 are spaced apart by a distance equal to the distance between the centers of holes 21 in a cassette 20. Thus, the cassettes 20 are held in alignment by rods 111. The forward ends of rods 111 terminate inwardly of bottom edge 103 by a distance from plate 105 greater than the thickness of a single cassette 20. The rods 111 are respectively aligned with the planes of pivot of ejectors 80 but the forward ends of rod 111 are disposed rearwardly of their path of vertical travel by a distance less than the thickness of a cassette 20.

Figure 3:
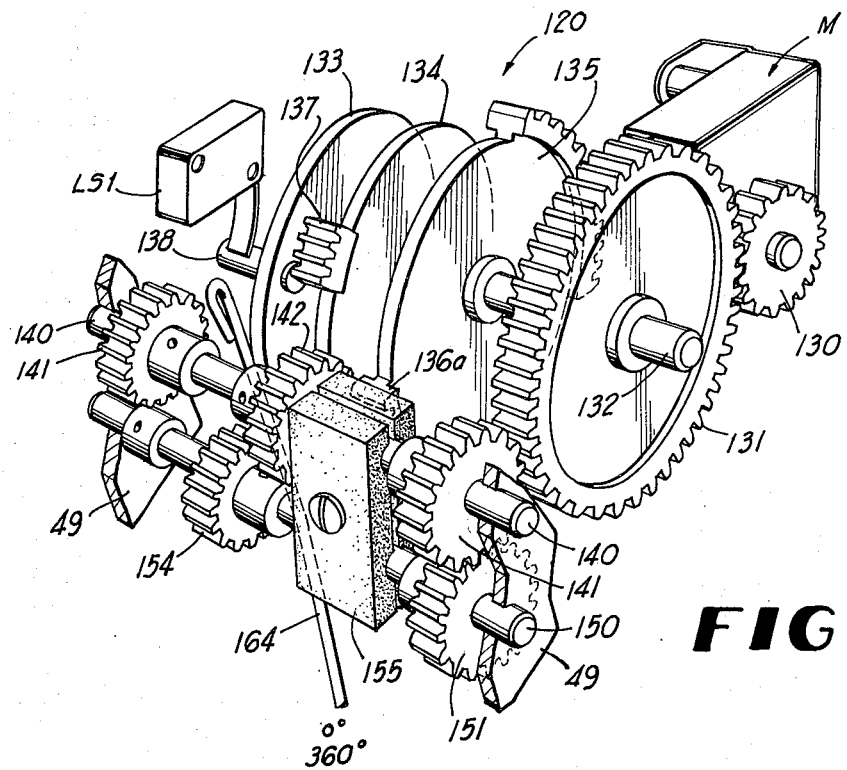
FIG. 3 is a fragmentary perspective view of the gear train of the cassette changer shown in FIG. 1.
Figure 6:
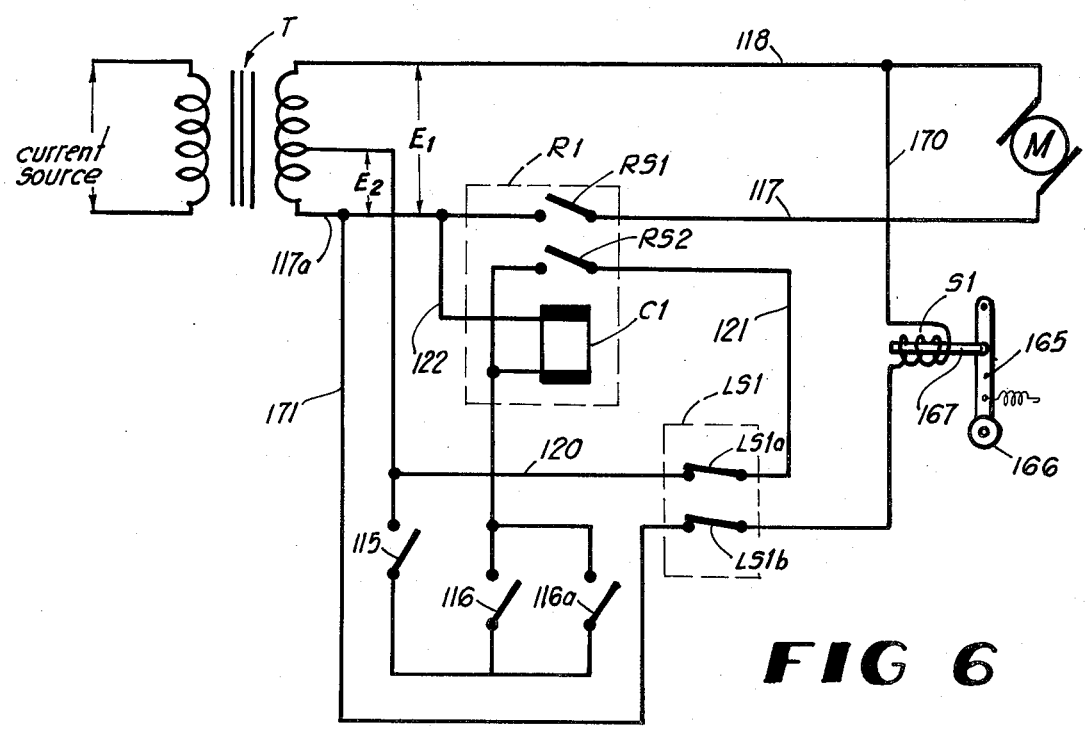
FIG. 6 is a wiring diagram of the electrical circuit of the machine of FIG. 1.

Coiled springs 112 are carried on rods 111 for urging the cassettes 20 forwardly, the forwrd movement of the foremost cassette 20 being normally arrested by the lower end portions of ejectors 80 and the rear surfaces of spaced vertical ribs 99 on the rear surface of ejector 80. A normally open cassette detector switch 115 in bottom 102 is depressed by the forward most cassette 20. For reciprocating the plate 61, the gear train 120, seen in FIG. 3, is employed. This gear train 120 includes, as seen in FIG. 6, a motor M electrically connected in series with a normally open relay switch RS1 of relay R1. The normally open detector switch 115 is in series with a normally open remote control switch 116 and the coil C of a hold down relay R1. The remote control switch 116 is on a microphone in a remote location. In parallel with switch 116 is a second normally open, control switch 116a, on the machine to detect and be closed by a metal strip at the end of the tape on the cassette 20. When the switches 115 and 116 or 116a are closed, the coil C is energized from a source of current $E_2$ of transformer T via wires 117, 117a and 118. A normally open hold down switch RS2 of relay R1, is in series with a normally closed switch LS1a of limit switch LS 1 via in wires 120, 121 and 122.

Thus, with the switch 115 being closed by detecting replacement cassette 20 in magazine 32, the momentarily closing of control switch 116 or 116a will energize coil C which will, then, close switches RS 1 and RS 2, starting motor M to rotate until limit switch LS1 is opened at the completion of the cycle.

Motor M drives, through gear 130, a drive gear 131 on one end of a shaft 132 journalled on panels 49. The shaft 132 carries spaced three disc 133, 134 and 135. The disc 134 carry an interrupted 90° gear 137 and a 45° gear (not shown). The disc 135 carries a 135° interrupted gear 136 and a 45° gear 136a. The disc 133 carries, adjacent its periphery, a cam lug 138.

Adjacent the parallel to shaft 132 is a control shaft 140 journalled by panels 49. Below the control shaft 140 is an auxiliary control shaft 150 also journalled by panels 49.

On the shaft 140, are a pair of spaced complimentary gears 141 which respectively mesh with racks 62 so that when shaft 140 is rotated clockwise, the plate 61 is lifted and when shaft 140 is rotated in a counterclockwise direction, plate 61 is lowered. A central gear 142 on shaft 140 is adapted to mesh with the interrupted gears 136 and 136a. Such meshing will rotate the shaft 140 clockwise over 135° and over 45° of a revolution respectively. One of gears 141 meshes with a drive gear 151 on shaft 150 while another gear 154 on shaft 150 is aligned to mesh with interrupted gears such as gear 137. A drag brake 155 prevents over travel.

The mechanism for opening and closing the cradle 16 includes a linkage actuated by lug 138 to depress button 18 for opening cradle 16, and a solenoid control actuated by switch LS 1b for closing it. The linkage includes a transverse shaft 160 on frame 50 and a rocker sleeve 161 rotatably carried by shaft 160. A radially extending control arm or rod 162 extends from sleeve 161 and has a turned down end or finger 163 which rests upon button 18.

A control lever 164 extends radially from the other end portion of sleeve 161 into the path of lug 138 so as to be pivoted outwardly thereby when the cycle starts. Thus, button 18 is depressed momentarily to open cradle 16 to the position shown in FIG. 1.

The closing mechanism for the cradle 16 includes a rocker arm 165, pivotally carried by one side panel 49, and a roller 166 at its free end. The rocker arm 165 is actuated by a plunger 167 of solenoid S 1. The solenoid S 1 is supplied with current from source $E_1$, via wires 170 and 171, when normally open switch LS 1b on switch LS1 is closed. Momentary closing and then opening of the switch LS 1b is accomplished when switch LS1 is engaged by lug 138 at the end of its cycle. This provides a pulse to solenoid S 1 to retract plunger 167 and thereby cause the rocker arm 165 to move roller 166 across the top of cradle 16 and close the same. a spring returns the plunger 167 and hence rocker arm 165 to their original position.

OPERATION

Figure 4:
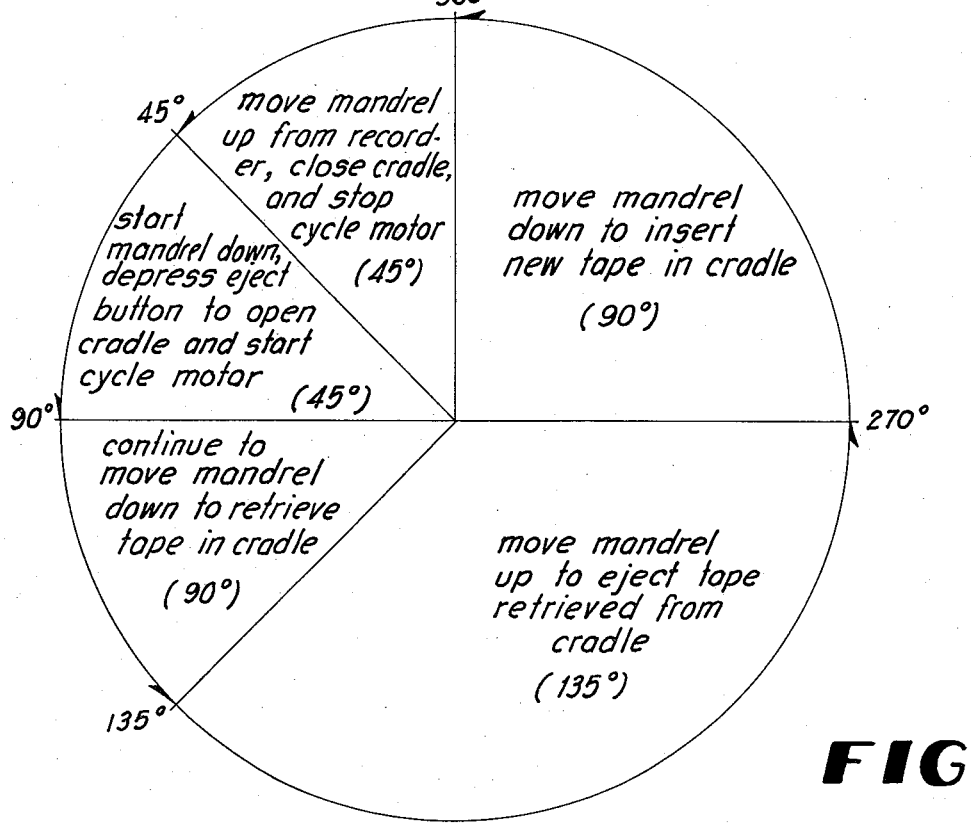
FIG. 4 is a schematic cycle diagram depicting a single cycle of the machine.
Figure 5:
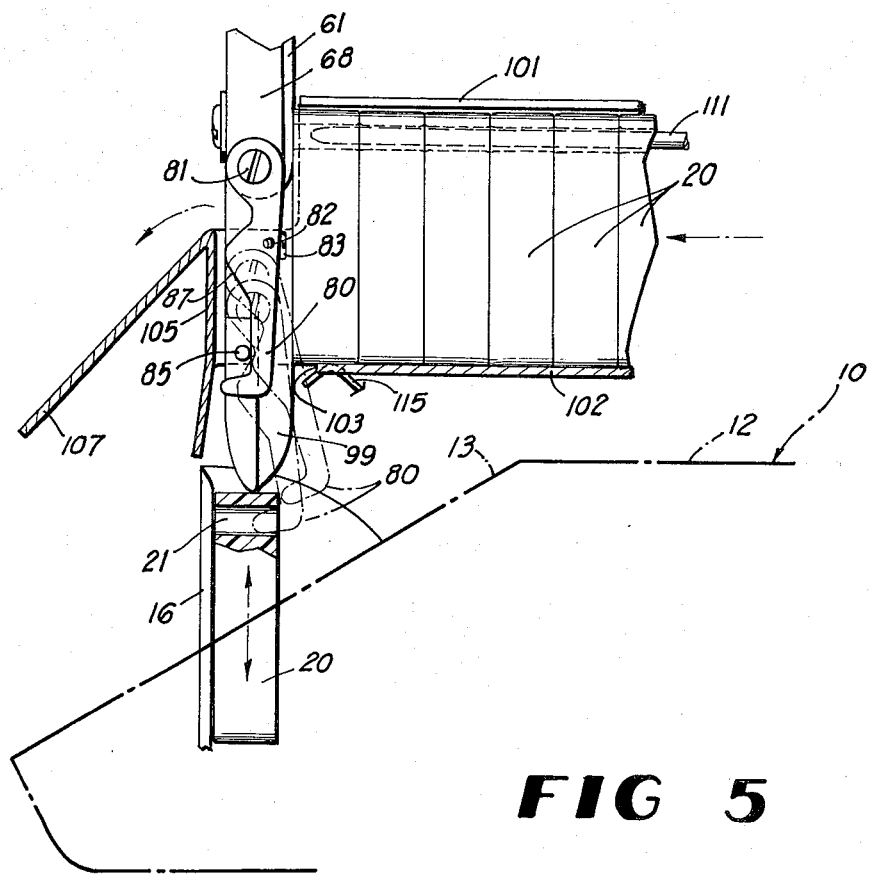
FIG. 5 is a vertical sectional view of a portion of the machine in FIG. 1.

The cycle of operation of the cassette changer 30 is depicted in FIG. 4. At the beginning of each cycle the lug 138 is slightly past limit switch LS1 (at about 45° from top dead center). Thus, switch LS 1a is closed and switch LS 1 is open. Switch 115 is closed because a replacement cassette 20 is available in the magazine 32.

When either the switch 116 is manually momentarily depressed at the remote microphone of the user or the switch 116a has detected the metal strip at the end of a tape, the switch 116 or 116a is closed, making a circuit, via wires 117, 117a, 118 to energize coil C 1. This energizataion of coil C 1 closes relay switches RS 1 and RS 2. The closing of switch RS 2 completes a hold down circuit, via wires 120, 121, 122 to coil C 1 to hold it in an energized condition until switch LS 1a is opened. Thus, the motor M is energized, via switch RS 1 and wires 123, 124, 125. This causes the lug 138 to make a 360° circle, striking switch LS 1 as it completes the cycle. The striking of switch LS 1 momentarily opens switch LS 1a for breaking the hold down circuit, and momentarily closes the switch LS 1b to actuate solenoid S 1 for closing cradle 16.

During the initial 45° of travel of lug 138 (from 45° to 90°), it engages and moves lever 164 to cause finger 163 to depress button 18 and open cradle 16 and gear 137 engages gear 154 to move the mandrel or ram 33 downward until edge 89 rests on the back of the cassette 20 within cradle 16.

During the next 45° of travel (from 90° to 135°) gear 137 continues to engage gear 154 to rotate shaft 150 clockwise and shaft 140 counterclockwise so as to move plate 61 through its total down travel. The downward movement of the plate 61 after the lower edge 89 of the mandrel or ram 33 engages the upper edge of the cassette 20 in the cradle 16, arrests further downward movement of ram 33; however, plate 61 continues its downward movement to compress springs 91 and move the ejectors 80, downwardly, past edge 89. Such relative movement between the ejectors 80 and the ram 33 causes the camming lobes 88 to pass over the pins 85 and urge the ejectors 80 rearwardly, thereby causing fingers 86 to move rearwardly adjacent the cassette 20 in cradle 16 and then be urged, by spring 82, inwardly into holes 21 of the cassette 20 in cradlel 16.

Since the rear edges of ejector 80 and ribs 99 arrest forward movement of the cassettes 20 in magazine 32, their rear surfaces being in a common vertical plane with the rear surface of plate 61, the plate 61, during the lowermost portion of its travel, arrests such movement of the cassettes 20 in the magazine 32.

During the next 135° (from 135° to 270°) of travel of lug 138, the plate 61 is moved upwardly by a distance of one and one-half times its initial downward movement. During the first increment of movement upwardly of plate 61, the ejector fingers 86 and the ram 33 are urged by springs 82 toward each other to clamp or lock the installed cassette 20 to the rack and ejector assembly 31. Further upward movement of plate 61 urges the clamped cassette 20 out of the cradle 16 and upwardly passing between the forwardmost cassette 20 in magazine 32 and arresting plate 105.

Further upward movement of plate 61 raises the lower edge 89 of ram 33 and ejectors 80 above the level of the forwardmost cassettes 20 in magazine 32. Thus, coiled springs 112 urge the cassettes forwardly so that the front cassette 20 pushes the clamped cassette 20 from its clamped position onto chute 107. This releases the ram 33 which engages the back edge of the cassette 20 from the magazine 32 which is now in registry with the empty pocket 19 of cradle 16.

During the next 90° (from 270° to 360°) of lug movement, plate 61, with the ram 33 extended, moves downwardly, yieldably forcing the new cassette 20 into packet 19.

Thereafter during the next 45° (from 0° to 45°) the plate 61 and ram 33 are moved upwardly and are returned to their original position. At the last portion of this increment in the cycle, lug 138 engages switch LS 1 to stop motor M and pulse the solenoid S 1 to move roller 166 across cradle 16 to close the cradle 16.

The upward movement of plate 61 is caused by the engagement of gear 136 with gear 142 over a 135° travel. The subsequent downward movement of plate 61 is caused by the engagement of gear (not shown) on disc 134 with gear 154 over 90° and the final up travel of plate 61 is caused by the engagement of gear 136a with gear 142.

We claim:
1. A cassette changer for a magnetic tape mechine of the type having a cradle moveable between an open position and a closed position, said cradle being adapted, in its open position, to receive a cassette, in the event that the cradle is empty and have a cassette removed therefrom, in the event that the cradle contains a cassette, said cradle being adapted in its closed condition to hold a cassette in a position to be operated by said machine; said cassette in a position to be operated by said machine; said cassette changer comprising:
   a. a first control means for causing said cradle to be moved from its closed position to its open position;
   b. second control means for moving said cradle from its open position to its closed position;
   c. a magazine for supporting a plurality of replacement cassettes;
   d. cassette engaging and moving means for engaging and removing a cassette from said cradle when said cradle is in its open position and contains such a cassette, and for thereafter inserting a replacement cassette from said magazine into said cradle while said cradle remains in its open position; and
   e. means for actuating in sequence said first control means and then said cassette engaging and moving means and thereafter said second control means, said cassette engaging and moving means including a plate movable toward and away from said machine, a ram movably carried by said plate, spring means for yieldably urging said ram toward said machine, said ram being positionable in registry with the open cradle of said machine for engaging the rear edge of a cassette within the opened candle when said plate is moved toward said cradle, ejector means connected to said plate for movement with said plate beyond the travel of said ram after said ram has engaged the rear portion of said cassette for engaging another portion of the cassette within said open cradle for grasping the same between said ejector means and said ram as said plate is moved away from said cradle.

2. The cassette defined in claim 1, wherein said ejectors are hook shaped members pivotally carried by said plate on opposite sides of said ram, said ejectors being pivoted by their upper end portions about a transverse axis and having fingers at their lower ends, spring means for urging said ejectors in one direction, pins on said ram for arresting said movement of said ejectors in said direction, said ejectors being provided with camming lobes engagable by said pins for causing said ejectors to move in the other direction so that their fingers are moved sufficiently to pass adjacent said rear portion of said cassette in said cradle and then projected into holes in the corners of said cassette in said cradle, said spring urging said ram and said ejectors into clamping positions to clamp said cassette therebetween for withdrawal from said cradle as said plate is moved away from said cradle.

3. The cassette change defined in claim 2, including a magazine for supporting a plurality of side-by-side replacement cassettes adjacent the path of travel of said ram and means for urging the endmost replacement cassette beneath said ram to replace the cassette removed from said cradle after said ram and said ejectors have withdrawn the cassette from said cradle whereby said ram urges the endmost cassette into said cradle when the ram is again moved toward said cradle.

4. The cassette changer defined in claim 3, wherein said magazine includes a pair of parallel rods for projecting through the holes in said cassettes, and spring means for yieldably urging said plurality of cassettes in said magazine toward said ram.

5. The cassette changer defined in claim 1 including drive means for reciprocating said plate, said drive means having a rack connected to said plate, a pinion gear meshing with said rack, interrupted gears for causing pinion gear to be rotated in one direction and then in the other and a motor for driving said interrupted gears.

6. In a cassette chager for operation in conjunction with a magnetic tape machine of the type which receives in a pocket a single cassette, the combination of:
   a. a frame for mounting on said machine;
   b. extracting means on said frame moveable from a position spaced from said pocket for engagement with a cassette in said pocket;
   c. movable means on said frame for moving said extracting means toward and away from said pocket and for causing extracting means to engage said cassette when said extracting means has been moved toward said pocket and to retain said cassette in an engaged condition by said extracting means, as said extracting means is moved away from said pocket to remove the cassette from said pocket;
   d. means for causing said extracting means to release the extracted cassette; and
   e. means for inserting a replacement cassette into said pocket after extraction of the extracted cassette therfrom and wherein said extracting means and said inserting means are carried together and are in registry with said pocket.

* * * * *